(12) United States Patent
Buczynski et al.

(10) Patent No.: US 11,629,742 B2
(45) Date of Patent: Apr. 18, 2023

(54) BOX NUT RETAINER

(71) Applicant: ILLINOIS TOOL WORKS INC., Glenview, IL (US)

(72) Inventors: Gregory G. Buczynski, Ferndale, MI (US); Clinton Pitt, Portland, TN (US)

(73) Assignee: Illinois Tool Works Inc., Glenview, IL (US)

( * ) Notice: Subject to any disclaimer, the term of this patent is extended or adjusted under 35 U.S.C. 154(b) by 163 days.

(21) Appl. No.: 16/422,738

(22) Filed: May 24, 2019

(65) Prior Publication Data

US 2019/0383318 A1 Dec. 19, 2019

Related U.S. Application Data

(60) Provisional application No. 62/686,870, filed on Jun. 19, 2018.

(51) Int. Cl.
| | |
|---|---|
| *F16B 37/02* | (2006.01) |
| *F16B 13/08* | (2006.01) |
| *F16B 5/02* | (2006.01) |
| *F16B 5/06* | (2006.01) |

(52) U.S. Cl.
CPC ............ *F16B 13/08* (2013.01); *F16B 5/0258* (2013.01); *F16B 37/02* (2013.01); *F16B 5/0642* (2013.01)

(58) Field of Classification Search
CPC ........ F16B 37/043; F16B 37/02; F16B 13/08; F16B 5/0258
USPC .................................. 411/173–175, 182, 970
See application file for complete search history.

(56) References Cited

U.S. PATENT DOCUMENTS

| | | | | |
|---|---|---|---|---|
| 4,133,246 A | * | 1/1979 | Small .................... | B60Q 1/0683 411/15 |
| 5,919,019 A | * | 7/1999 | Fischer ................. | F16B 37/043 411/112 |
| 6,726,418 B2 | * | 4/2004 | Dickinson ............. | F16B 37/043 411/179 |
| 6,745,440 B2 | * | 6/2004 | Vassiliou .............. | F16B 5/0664 24/457 |
| 6,896,461 B2 | * | 5/2005 | Fleydervish ............ | F16B 37/02 411/55 |
| 7,874,775 B2 | * | 1/2011 | Hullmann ............. | F16B 37/043 411/173 |
| 8,800,120 B2 | * | 8/2014 | Benedetti .............. | F16B 5/0642 24/458 |

(Continued)

FOREIGN PATENT DOCUMENTS

| | | |
|---|---|---|
| CN | 103591110 A | 2/2014 |
| CN | 207093546 U | 3/2018 |

(Continued)

OTHER PUBLICATIONS

Search Report, related EP Application No. 19179613.5, dated Nov. 6, 2019, 12 pages.

(Continued)

*Primary Examiner* — Flemming Saether
(74) *Attorney, Agent, or Firm* — Quarles & Brady LLP

(57) ABSTRACT

A first example box nut retainer includes a support, a fastener sleeve, and a resilient arm. The fastener sleeve defines an opening and extends downwardly from the support. The resilient arm extends upwardly and outwardly relative to the fastener sleeve toward the support.

20 Claims, 9 Drawing Sheets

(56) References Cited

U.S. PATENT DOCUMENTS

| | | | |
|---|---|---|---|
| 8,939,690 B2* | 1/2015 | Kuhm | F16B 37/043 |
| | | | 411/182 |
| 9,440,596 B2* | 9/2016 | Huelke | B60R 13/0206 |
| 9,562,554 B2* | 2/2017 | Vidal | F16B 37/02 |
| 9,631,662 B2* | 4/2017 | Boyer | F16B 37/02 |
| 10,837,481 B2* | 11/2020 | Deperro | F16B 13/124 |
| 2004/0081534 A1 | 4/2004 | Dickinson et al. | |
| 2009/0180842 A1 | 7/2009 | Johnson et al. | |
| 2011/0163562 A1* | 7/2011 | Smith | F16B 37/0842 |
| | | | 296/1.07 |
| 2013/0101370 A1 | 4/2013 | Kuhm et al. | |
| 2015/0267734 A1 | 9/2015 | Boyer et al. | |
| 2016/0208839 A1 | 7/2016 | Vidal et al. | |

FOREIGN PATENT DOCUMENTS

| | | |
|---|---|---|
| CN | 207470541 U | 6/2018 |
| DE | 202006019411 U1 | 10/2007 |
| EP | 0930440 A1 | 7/1999 |

OTHER PUBLICATIONS

Examination Report, related European Patent Application No. 19179613.5, dated Feb. 14, 2022 (5 pages).

* cited by examiner

BOX NUT RETAINER

RELATED APPLICATION

This application is based on, claims priority to, and incorporates herein by reference in its entirety U.S. Provisional Application No. 62/686,870, filed on Jun. 19, 2018.

FIELD OF THE DISCLOSURE

Embodiments of the present disclosure generally relate to a fastening system, and, more particularly, to a box nut retainer system that is configured to securely connect multiple components together.

BACKGROUND

In recent years, retainers have been developed to fasten panels to one another. For example, vehicles include various panels (e.g., sheet metal, polymer, etc.) connected to one another to form the body, doors, and interior of the vehicle.

Certain known retainers are configured to fit into an opening defined in a panel. When a fastener is threaded into the retainer, the retainer expands to retainingly engage the panel.

However, these known retainers fit loosely within the panel prior to installing a fastener. Relative movement between the retainer and the panel may lead to misalignment of the fastener in the retainer, sometimes referred to as cross-threading.

Therefore, a need exists for a box nut that is configured to remain at a secure fixed position in relation to a component, such as a panel.

SUMMARY

In one aspect, a first example box nut retainer is disclosed that includes a support, a fastener sleeve, and a resilient arm. The fastener sleeve defines an opening and extends downwardly from the support. The resilient arm extends upwardly and outwardly relative to the fastener sleeve toward the support.

In another aspect of the first example box nut retainer, the resilient arm defines a ledge.

In another aspect of the first example box nut retainer, the fastener sleeve is internally threaded.

In another aspect of the first example box nut retainer, the resilient arm extends beyond the support.

In another aspect of the first example box nut retainer, the resilient arm partially overshadows the opening.

In another aspect of the first example box nut retainer, the resilient arm has a serrated finger.

In another aspect of the first example box nut retainer, the serrated finger is generally parallel with the fastener sleeve.

In another aspect, the first example box nut retainer also includes a leg extending from the support and a tab extending from the leg to at least partially overshadow the opening.

In another aspect of the first example box nut retainer, the leg extends from the support via a curved orthogonal angle.

In another aspect of the first example box nut retainer, the tab extends from the leg via a curved orthogonal angle.

In another aspect of the first example box nut retainer, one or more of the tab and the leg are tapered toward the opening.

In another aspect of the first example box nut retainer, the resilient arm pivots resiliently relative to the tab.

In another aspect of the first example box nut retainer, the resilient arm extends from the tab via a planar portion aligned with the tab.

In another aspect of the first example box nut retainer, the leg is a first leg and further comprises a second leg extending downwardly from the support, wherein the tab extends from the second leg to link the first leg to the second leg.

In another aspect of the first example box nut retainer, the resilient arm is between the first leg and the second leg.

In a further aspect, a second example box nut retainer is disclosed that includes a first resilient arm, a second resilient arm, and a fastener sleeve. The second resilient arm is opposite the first resilient arm. The fastener sleeve is between the first resilient arm and the second resilient arm. The fastener sleeve defines an opening.

In another aspect of the second example box nut retainer, one or more of the first resilient arm and the second resilient arm has a serrated finger.

In another aspect, the second example box nut retainer also includes a leg engaged with the fastener sleeve and a tab extending from the leg to at least partially overshadow the opening.

In a yet further aspect, a third example box nut retainer is disclosed that includes a fastener sleeve, a first leg, a first tab, a second leg, a second tab, and a resilient arm. The fastener sleeve defines an opening. The first leg is connected to the fastener sleeve. The first tab extends from the first leg to at least partially overshadow the opening. The second leg is connected to the fastener sleeve opposite the first leg. The second tab extends from the second leg to at least partially overshadow the opening. The resilient arm extends outwardly from the second tab.

In another aspect of the third example box nut retainer, the resilient arm includes a serrated finger.

Figure 1:
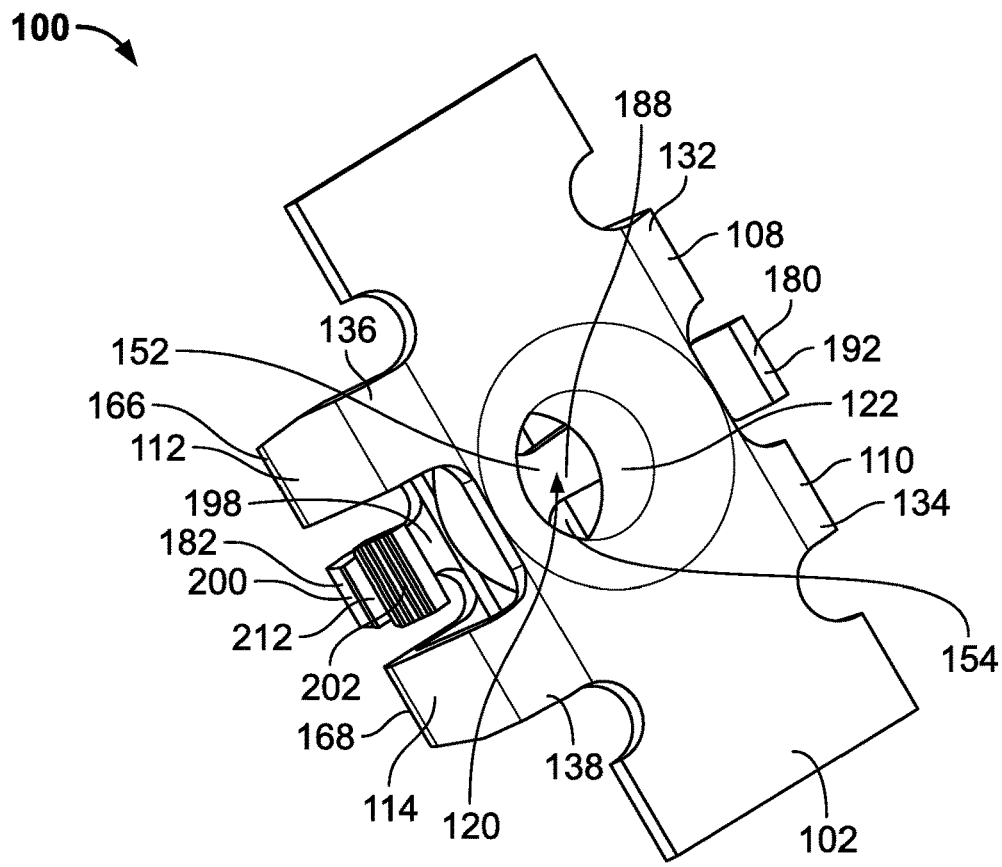
FIG. 1 is an isometric view of a box nut retainer according to an embodiment of the present disclosure.

Before the embodiments of the disclosure are explained in detail, it is to be understood that the disclosure is not limited in its application to the details of construction and the arrangement of the components set forth in the following description or illustrated in the drawings. The disclosure is capable of other embodiments and of being practiced or being carried out in various ways. Also, it is to be understood that the phraseology and terminology used herein are for the purpose of description and should not be regarded as limiting. The use of "including" and "comprising" and variations thereof is meant to encompass the items listed thereafter and equivalents thereof as well as additional items and equivalents thereof.

DETAILED DESCRIPTION OF EMBODIMENTS OF THE DISCLOSURE

Embodiments of the present disclosure provide a box nut retainer with features that prevent incidental movement of the box nut retainer system prior to engagement of a fastener therewith and prevent disengagement of the box nut retainer.

A box nut retainer 100 according to an embodiment of the present disclosure is depicted in FIGS. 1-15. The box nut retainer 100 includes a support 102 that extends a length of the box nut retainer 100. With reference to FIGS. 1, 2, 7, 8, 10, 11, and 14, the box nut retainer 100 includes a first leg 108, a second leg 110, a third leg 112, and a fourth leg 114. With reference to FIGS. 1, 2, 7-12, and 15, the box nut retainer 100 defines an opening 120 and includes a fastener sleeve 122. More specifically, the fastener sleeve 122 extends downwardly from the support 102 to define the opening 120. The opening 120 extends through the support 102. The fastener sleeve 122 is centrally positioned relative to the support 102. In other words, with reference to FIGS. 1, 2, 7, 8, 10, 11, and 14, the fastener sleeve 122 is interposed between the first, second, third, and fourth legs 108, 110, 112, 114.

Figure 13:
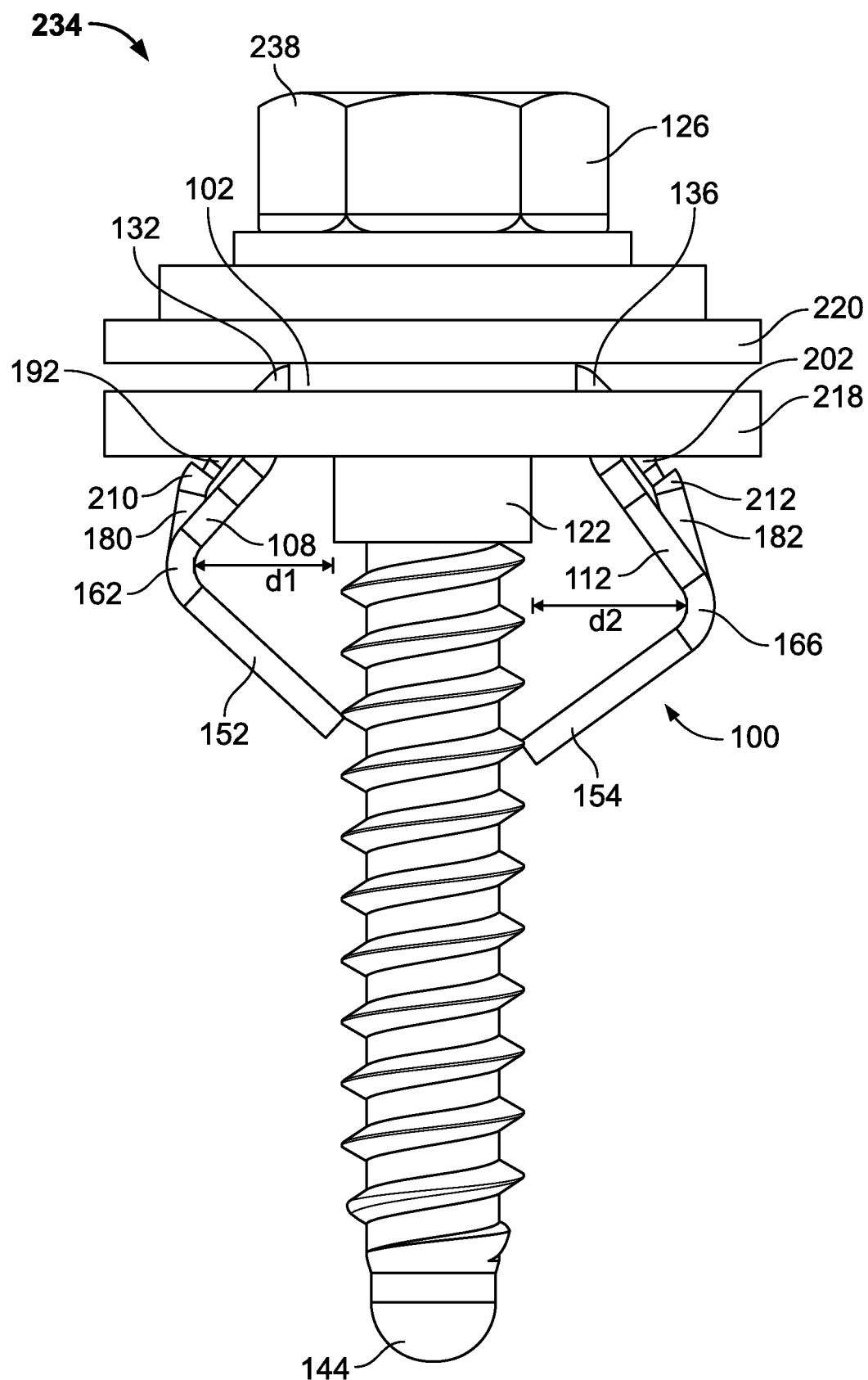
FIG. 13 is a side view of an example assembly including the box nut retainer of FIGS. 1-12 installed in the first panel of FIGS. 10-12 and utilized with a fastener to attach a second panel to the first panel of FIGS. 10-12.
Figure 14:
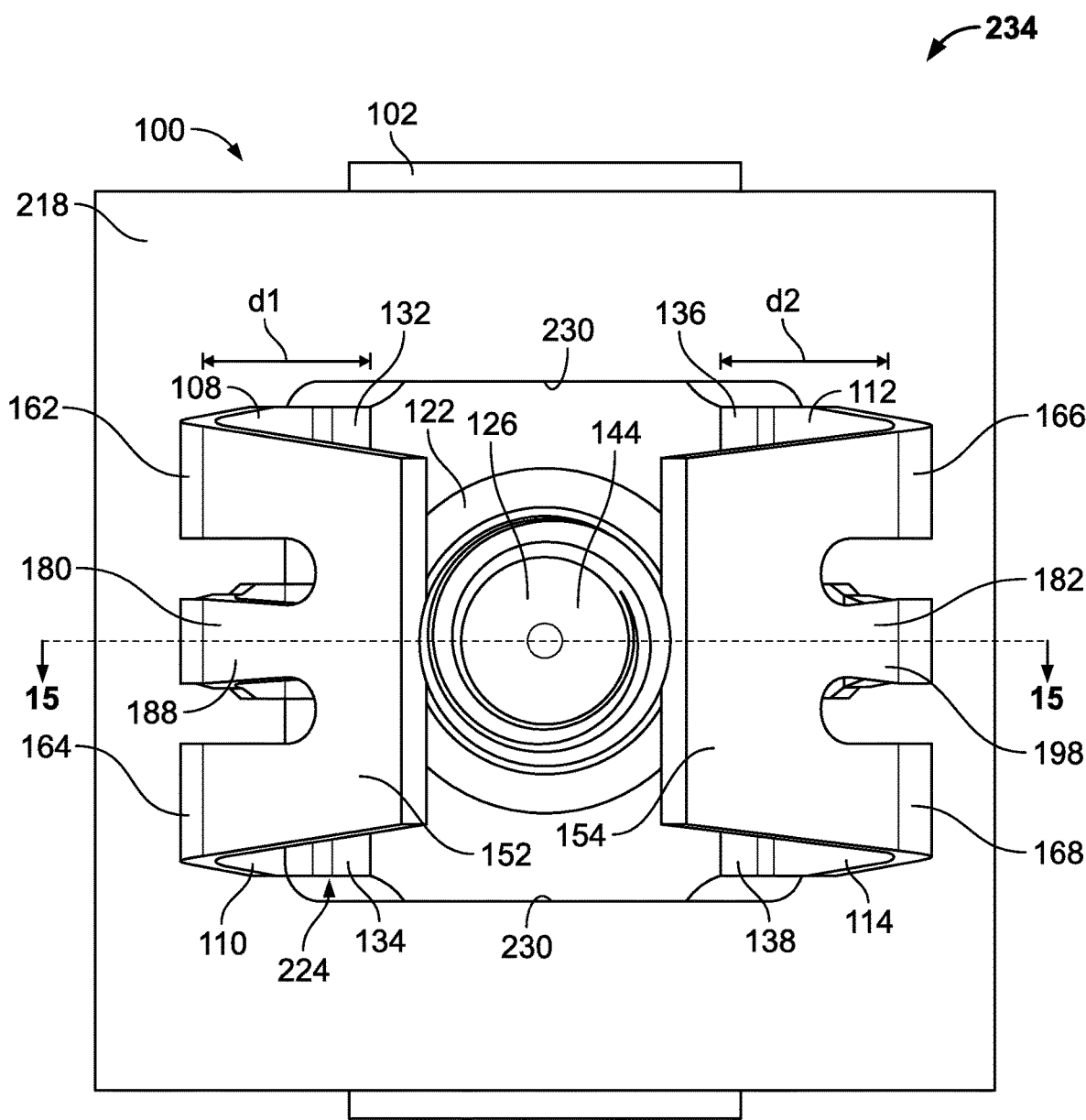
FIG. 14 is a bottom view of the example assembly of FIG. 13.
Figure 15:
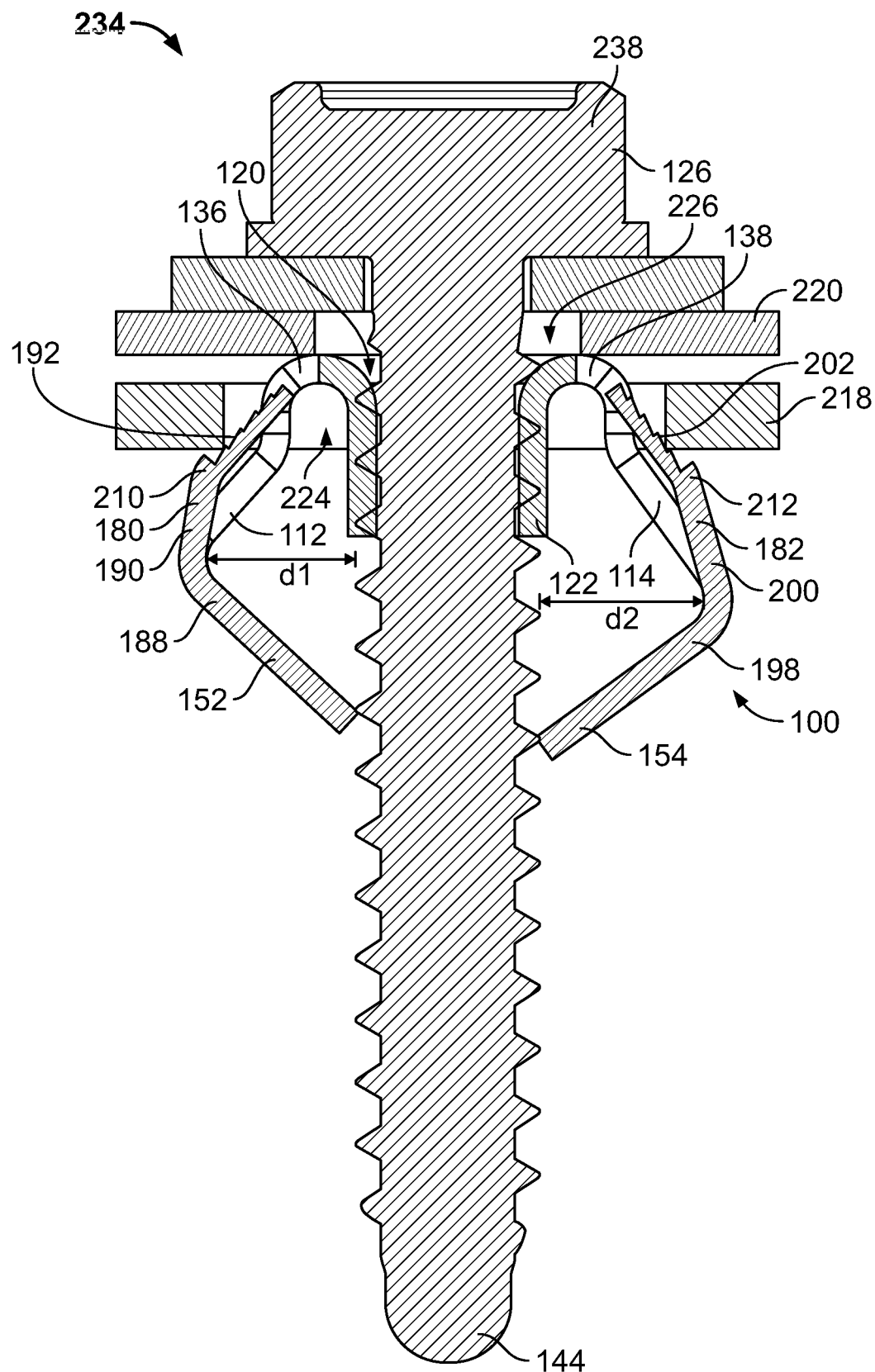
FIG. 15 is a cross-sectional view of the example assembly of FIGS. 13 and 14 taken along line 15-15 of FIG. 14.

With reference to FIGS. 13-15 the fastener sleeve 122 is configured to receive an externally threaded fastener 126 (e.g., a screw, bolt, etc.). For example, looking specifically at FIG. 15, the opening 120 of the fastener sleeve 122 is configured to receive the fastener 126. In some embodiments, the fastener sleeve 122 is internally threaded to guide and/or align the fastener 126 to traverse through the fastener sleeve 122.

Additionally or alternatively, the fastener sleeve 122 may be configured to accept a specific type of fastener. As but one non-limiting example, the fastener sleeve 122 may be configured to accept M5 fasteners. The fastener sleeve 122 may be configured to have a diameter based on the M5 fastener. The M5 bolts may include a socket head/cap screw of 4 mm, and a hex nut and/or bolt diameter of 8 mm. Optionally, the M5 screws have a button head cap screw and/or a flat head countersunk cap screw of 3 mm. The bolt and/or screw can have a set screw length between 2.5 mm to 7.5 mm. Optionally, the M5 screws and/or bolts are based on the International Organization for Standardization (ISO) 965, "ISO General Purpose Metric Screw Thread-Tolerances," the American National Standards Institute B4.2-1978, "Preferred Metric Limits and Fits," the American National Standards Institute B1.13M, "Metric Screw Threads: M Profile," and/or the like. In other examples, the fastener sleeve 122 may be configured to accept non-threaded fasteners (e.g., rivets, barbed push-in fasteners, rods, dowels, etc.).

Figure 4:
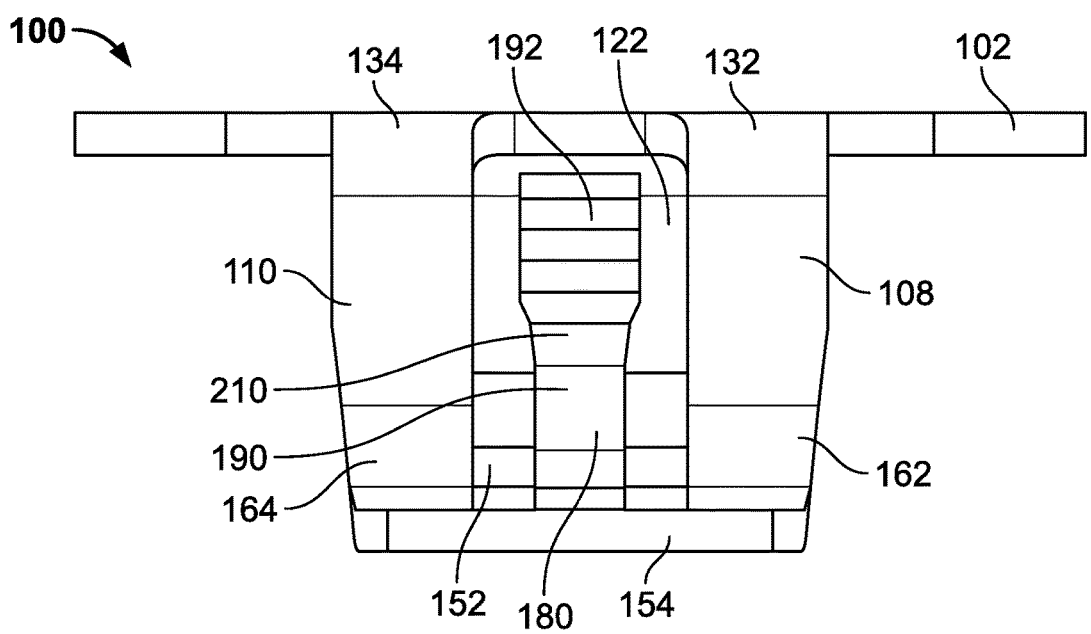
FIG. 4 is a side view of the box nut retainer of FIGS. 1-3.

With reference to FIGS. 1, 2, 7, 8, 10, 11, and 14, the first, second, third, and fourth legs 108, 110, 112, 114 extend from the support 102 outboard of the fastener sleeve 122. For example, with reference to FIGS. 1, 7, and 10, the first, second, third, and fourth legs 108, 110, 112, 114 respectively protrude and/or extend from the support 102 along first, second, third, and fourth curved orthogonal angles 132, 134, 136, 138. The first, second, third, and fourth curved orthogonal angles 132, 134, 136, 138 connect the first, second, third, and fourth legs 108, 110, 112, 114 to the support 102. The first, second, third, and fourth curved orthogonal angles 132, 134, 136, 138 are angled to protrude outwardly from the support 102. Based on the respective angles of the first, second, third, and fourth curved orthogonal angles 132, 134, 136, 138, the first, second, third, and fourth legs 108, 110, 112, 114 are outwardly disposed from the support 102. With reference to FIG. 4, the first and second curved orthogonal angles 132, 134, are configured to downwardly direct the first and second legs 108, 110, respectively. Similarly, with reference to FIG. 6, the third and fourth curved orthogonal angles 136, 138 are configured to downwardly direct the third and fourth legs 112, 114, respectively.

Figure 3:
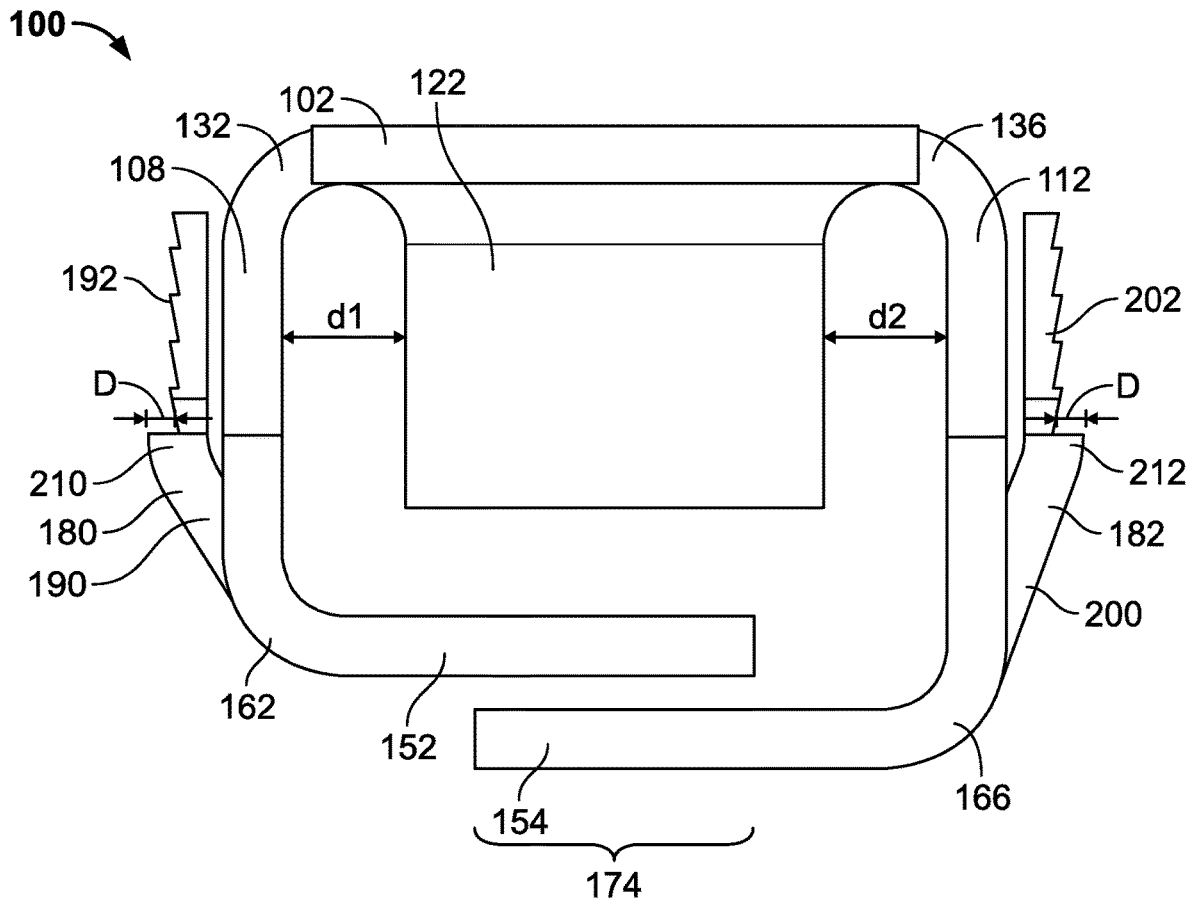
FIG. 3 is an end view of the box nut retainer of FIGS. 1 and 2.

With reference to FIG. 3, the extension of the first curved orthogonal angle 132 is configured to define a first distance d1 between the first leg 108 and the fastener sleeve 122. The extension of the third curved orthogonal angle 136 is configured to define a second distance d2 between the third leg 112 and the fastener sleeve 122.

Figure 5:
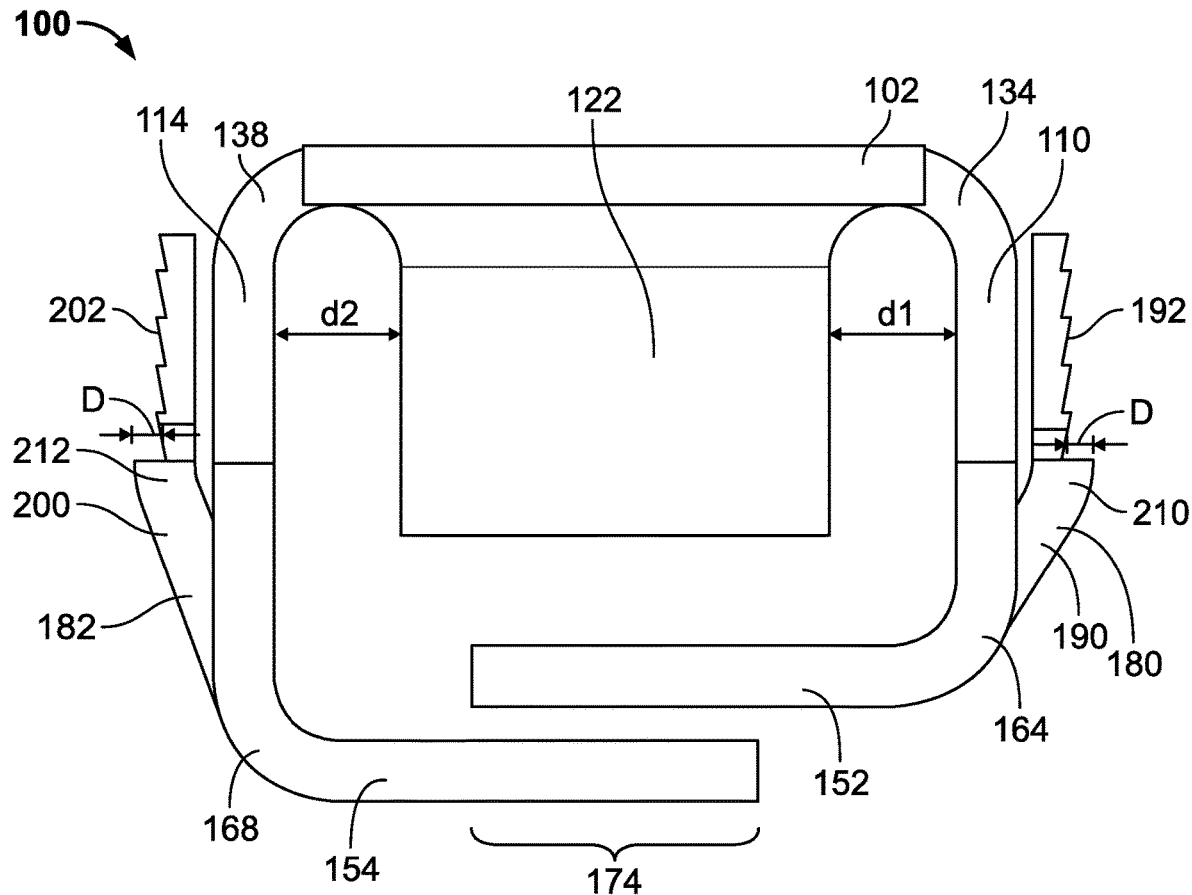
FIG. 5 is another end view of the box nut retainer of FIGS. 1-4.
Figure 6:
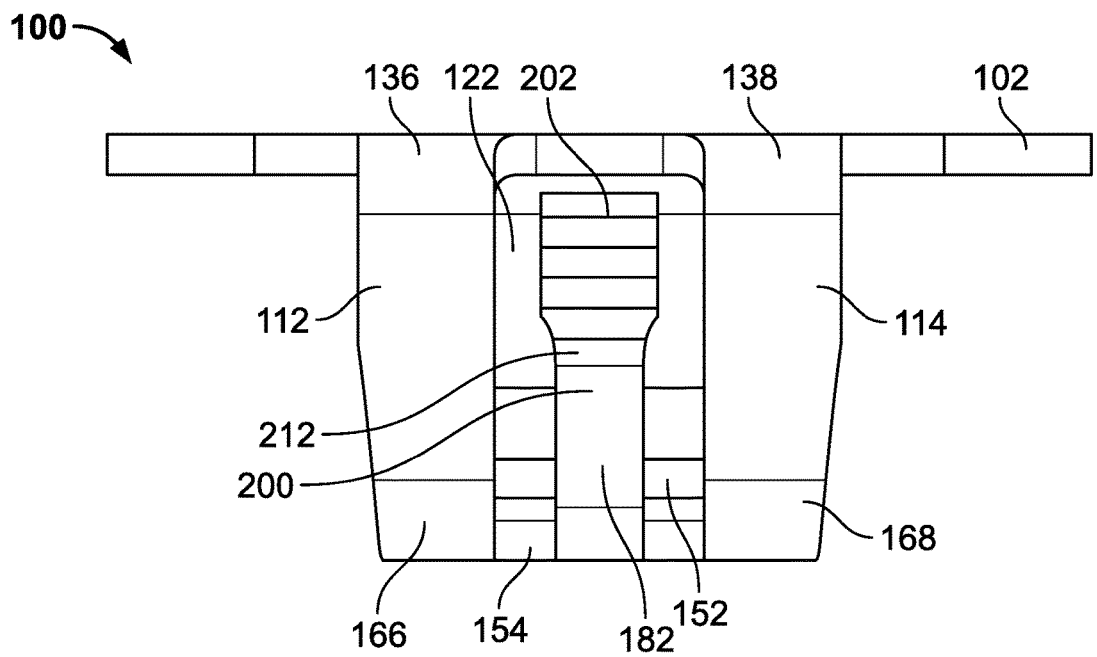
FIG. 6 is another side view of the box nut retainer of FIGS. 1-5.
Figure 7:
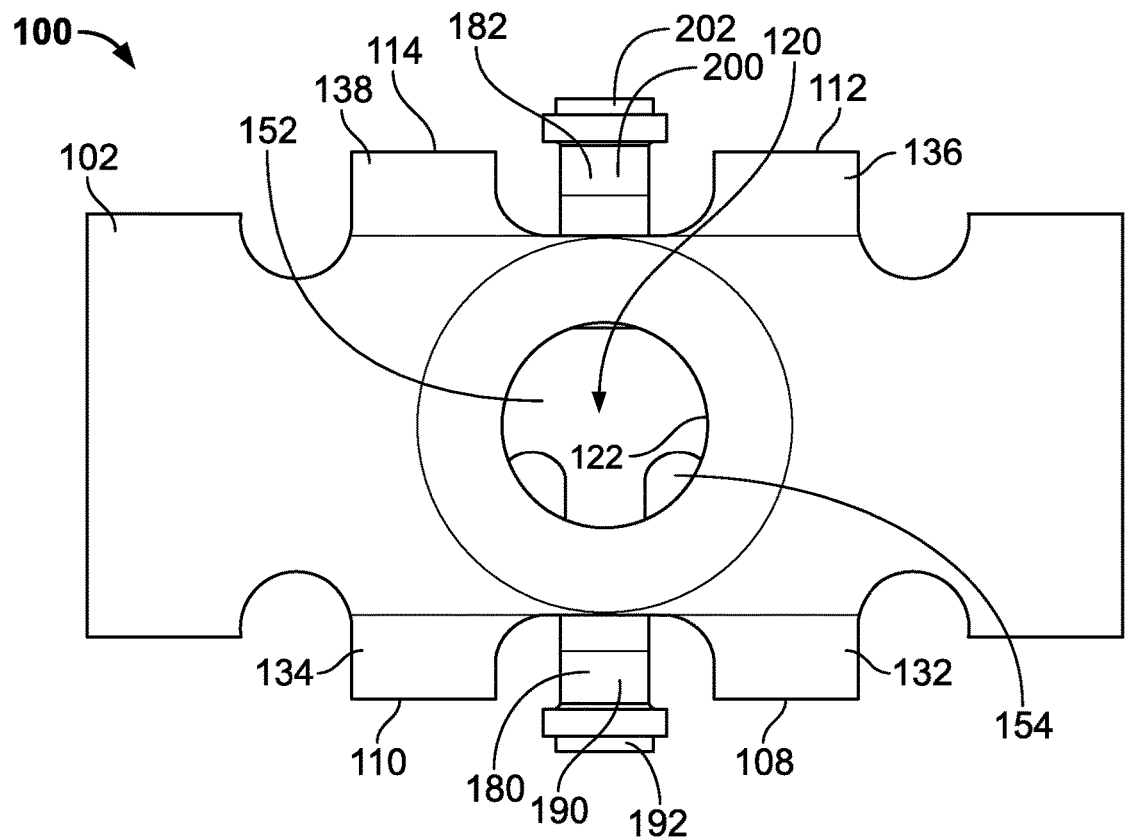
FIG. 7 is a top view of the box nut retainer of FIGS. 1-6.

With reference to FIG. 5, the extension of the second curved orthogonal angle 134 is configured to further define the first distance d1 between the second leg 110 and the fastener sleeve 122. The extension of the fourth curved orthogonal angle 138 is configured to further define the second distance d2 between the fourth leg 114 and the fastener sleeve 122.

With reference to FIG. 13, the first and second distances d1, d2 allow the first and third legs 108, 112 to spread out responsive to a distal end 144 of the fastener 126 traversing through the fastener sleeve 122 without abutting and/or in contacting the fastener sleeve 122 and/or the fastener 126. Similarly, with reference to FIG. 15, the first and second distances d1, d2 allow the second and fourth legs 110, 114 to spread out in the same manner as the first and third legs 108, 112 when the distal end 144 passes through the fastener sleeve 122. For example, with reference to FIG. 14, responsive to the distal end 144 of the fastener 126 traversing through the fastener sleeve 122, the first, second, third, and fourth legs 108, 110, 112, 114 extend outwardly beyond the support 102. As the first, second, third, and fourth legs 108, 110, 112, 114 spread out and/or extend, the respective first and second distances d1, d2 between the first, second, third, and fourth legs 108, 110, 112, 114 and the fastener sleeve 122 increase. The increases in the first and second distances d1, d2 allow the first, second, third, and fourth legs 108, 110, 112, 114 to spread out without being in contact with the fastener sleeve 122.

Figure 2:
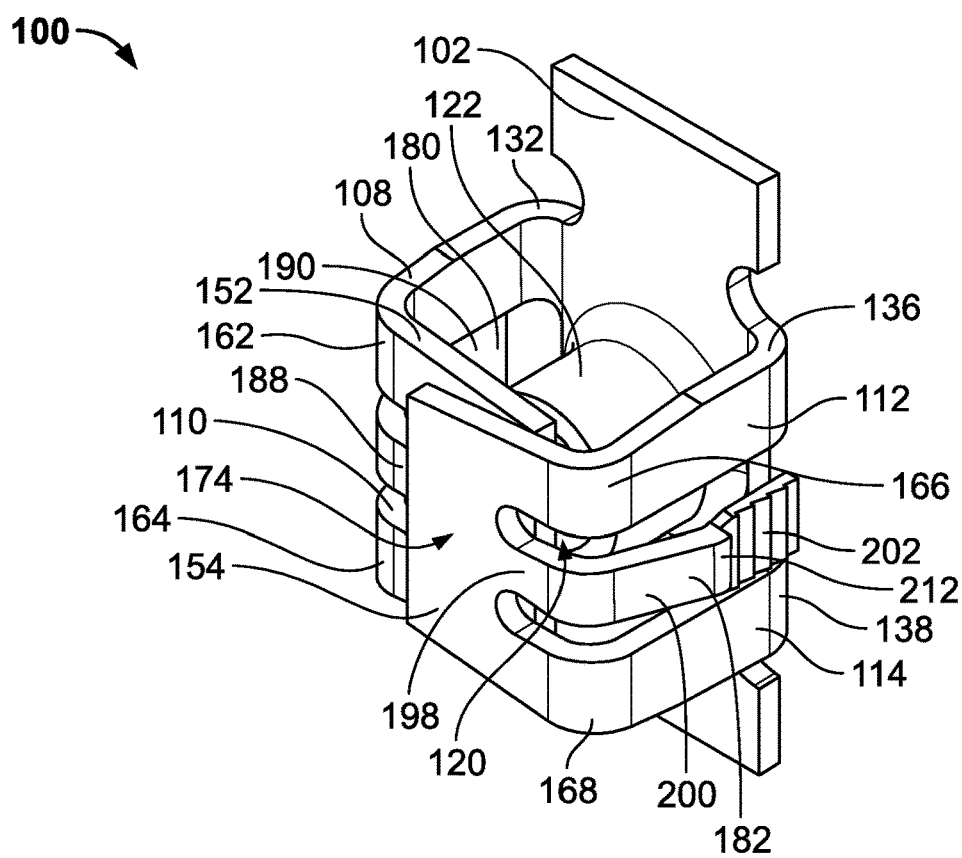
FIG. 2 is another isometric view of the box nut retainer of FIG. 1.

With reference to FIG. 2, the first, second, third, and fourth legs 108, 110, 112, 114 extend downward and connect to first and second tabs 152, 154 that extend inwardly with the first tab 152 being positioned over and overlapping the second tab 154. The first tab 152 is connected to the first and second legs 108, 110 by fifth and sixth curved orthogonal angles 162, 164, respectively. The second tab 154 is connected to the third and fourth legs 112, 114 by seventh and eighth curved orthogonal angles 166, 168, respectively. The fifth and sixth curved orthogonal angles 162, 164 direct the first tab 152 from the first and second legs 108, 110 toward the opposing third and fourth legs 112, 114. Similarly, the seventh and eighth curved orthogonal angles 166, 168 direct the second tab 154 from the third and fourth legs 112, 114 toward the opposing first and second legs 108, 110. In other words, the first tab 152 of the first and second legs 108, 110 is directed toward the third and fourth legs 112, 114 and the second tab 154 of the third and fourth legs 112, 114 is directed toward the first and second legs 108, 110. Additionally or alternatively, the first and second legs 108, 110 are coupled together to form the first tab 152, and the third and fourth legs 112, 114 are coupled together to form the second tab 154.

With reference to FIGS. 2, 3, 5, 8, 9, 11, and 12, because the first and second tabs 152, 154 overlap one another, the first and second tabs 152, 154 form an overlap region 174. Additionally, with reference to FIGS. 1, 2 and 7-12, the first and second tabs 152, 154 partially overshadow the opening 120.

With reference again to FIGS. 2, 3, 5, 8, 9, 11, and 12, the overlap region 174 is configured to encounter a fastener (e.g., the fastener 126 of FIGS. 13-15) traversing through the fastener sleeve 122. For example, after traversing through the fastener sleeve 122, the fastener presses against the overlap region to spread the first and second tabs 152, 154 from one another. Further, with reference to FIG. 13, as the first and second tabs 152, 154 spread, the first and third legs 108, 112, spread from one another. Similarly, with reference to FIG. 15, as the first and second tabs 152, 154 spread, the second and fourth legs 110, 114, spread from one another. In other words, with reference to FIG. 14, pressure applied by the fastener 126 separates the first and second tabs 152, 154 and spreads the first, second, third, and fourth legs 108, 110, 112, 114 outwardly beyond the support 102, as will be described in more detail below.

With reference to FIGS. 1-3, 5, and 7-15, the box nut retainer 100 further includes first and second arms 180, 182 extending outwardly and upwardly from portions of the first and second tabs 152, 154. The first and second arms 180, 182 are opposite one another.

With reference to FIGS. 8, 9, 11, and 12, the first arm 180 includes a first planar portion 188 aligned with the first tab 152 and a first angled portion 190 that extends from the first planar portion 188 outwardly relative to the first and second legs 108, 110 and upwardly toward the support 102. The first planar portion 188 partially overshadows the opening 120. The first arm 180 also includes a first serrated finger 192 extending from the first angled portion 190 toward the support 102.

With reference again to FIGS. 8, 9, 11, and 12, the second arm 182 includes a second planar portion 198 aligned with the second tab 154 and a second angled portion 200 that extends from the second planar portion 198 outwardly relative to the third and fourth legs 112, 114 and upwardly toward the support 102. The second planar portion 198 partially overshadows the opening 120. The second arm 182 also includes a second serrated finger 202 extending from the second angled portion 200 toward the support 102.

In some embodiments, the first and second serrated fingers 192, 202 may be generally parallel to the first, second, third, and fourth legs 108, 110, 112, 114 and to the fastener sleeve 122. In other embodiments, the first and second serrated fingers 192, 202 may be angled inwardly with the first and serrated fingers 192, 202 extending toward the fastener sleeve 122 or may be angled outwardly. While the first and second serrated fingers 192, 202 are shown with a particular number and shape of serrations, any suitable number and/or shape of serrations may be utilized.

Figure 11:
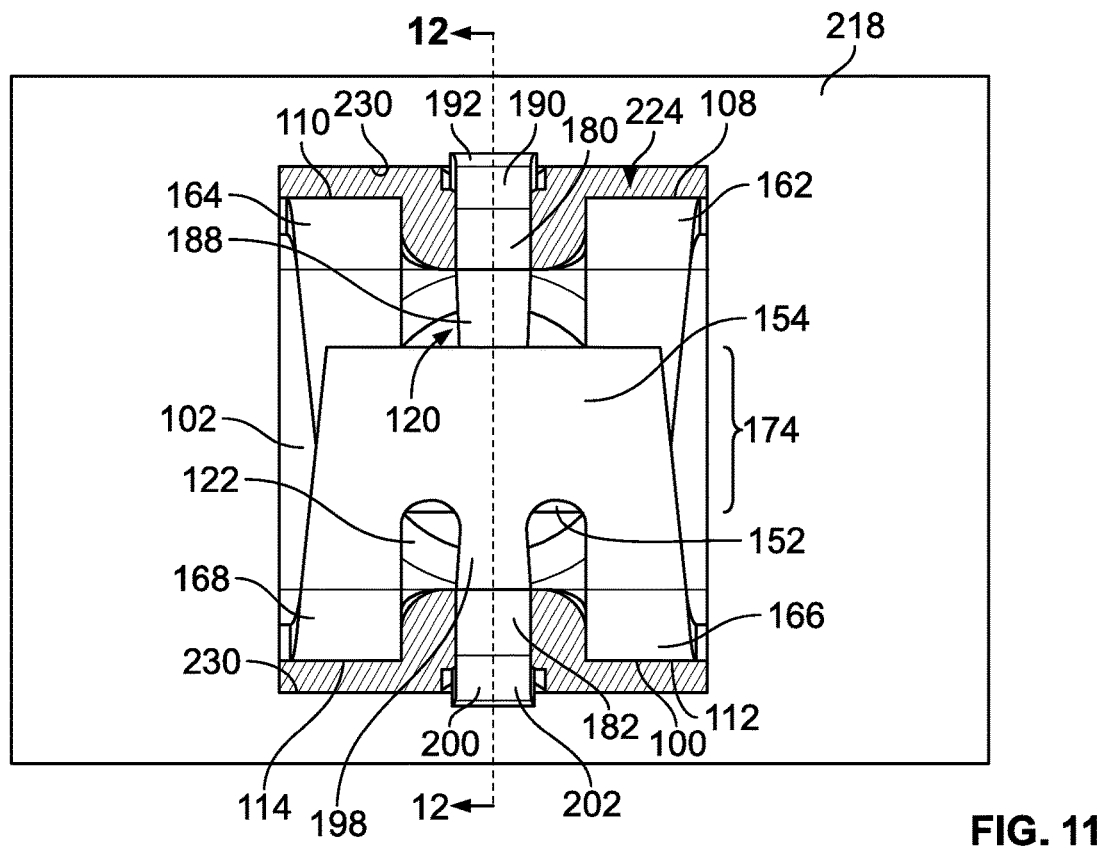
FIG. 11 is a bottom view of the box nut retainer of FIGS. 1-10 installed in the first panel of FIG. 10.
Figure 12:
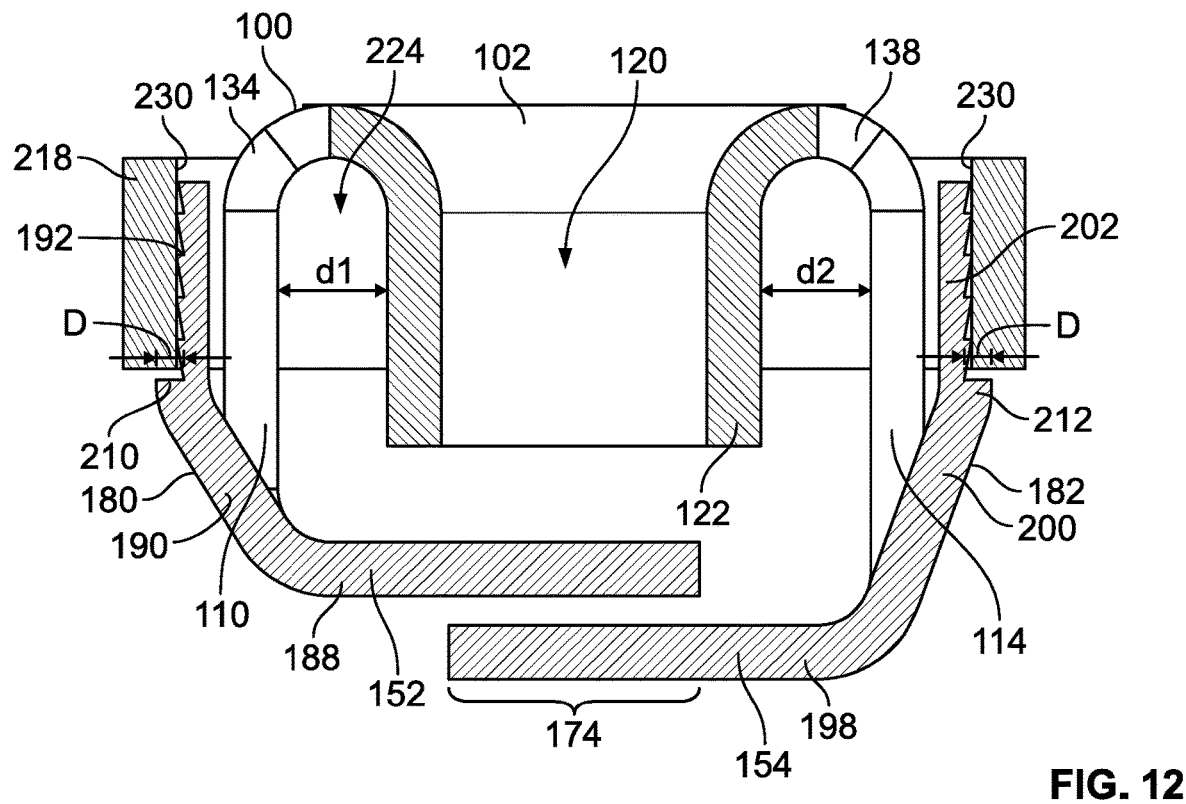
FIG. 12 is a cross-sectional view of the box nut retainer of FIGS. 1-11 installed in the first panel of FIGS. 9 and 10 taken along line 12-12 of FIG. 11.

With reference again to FIGS. 8, 9, 11, and 12, the first angled portion 190 and the first serrated finger 192 define a first ledge 210. Similarly, the second angled portion 200 and the second serrated finger 202 define a second ledge 212. With reference to FIGS. 9 and 12, while the first and second serrated fingers 192, 202 provide some resistance to removal of the box nut retainer 100 from a first panel 218, the first and second ledges 210, 212 are of a greater depth D and prevent removal of the box nut retainer 100 from the first panel 218.

Figure 10:
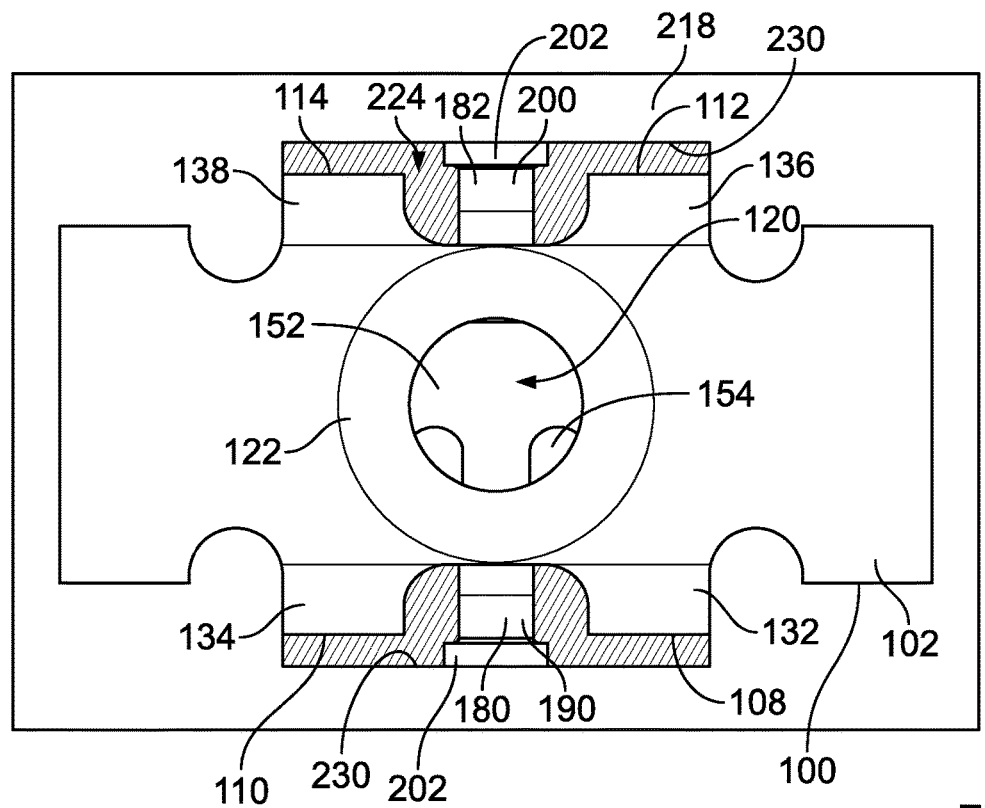
FIG. 10 is a top view of the box nut retainer of FIGS. 1-9 installed in a first panel.

With reference to FIGS. 13-15, the box nut retainer 100 is generally utilized to secure two components together. In an exemplary embodiment, the box nut retainer 100 is utilized to secure a second panel 220 to the first panel 218 using the fastener 126. The first panel 218 defines a first aperture 224. With reference to FIGS. 10, 11, and 14, the first aperture 224 is noncircular (e.g., rectilinear, ovate, ovular, polygonal, etc.). With reference to FIG. 15, the second panel 220 defines a second aperture 226.

With reference to FIGS. 10-12 in an exemplary installation method, the box nut retainer 100 is first inserted into the first aperture 224 in the first panel 218. The support 102 prevents pushing the box nut retainer 100 through the first panel 218 in an insertion direction. With reference to FIG. 12, as the box nut retainer 100 is pushed through, the first and second serrated fingers 192, 202 catch on walls 230 forming the first aperture 224 and the first and second ledges 210, 212 retain the box nut retainer 100 within the first panel 218 (opposite the way the box nut retainer 100 was installed). The shape of the first and second serrated fingers 192, 202 allow for accommodating panels of different thicknesses. The first arm 180 resiliently pivots relative to the first tab 152. The second arm 182 resiliently pivots relative to the second tab 154. Thus, the first and second arms 180, 182 allow the box nut retainer 100 to resiliently and slidably move along the first panel 218 while still remaining engaged with the first panel 218. In other words, when the box nut retainer 100 is installed in the first panel 218, the first and second arms 180, 182 act as springs to laterally stabilize the box nut retainer 100 in the first aperture 224. With reference to FIGS. 13-15, the box nut retainer 100, the first and second panels 218, 220, and the fastener 126 (as well as other potential components) may be referred to herein as a box nut retainer system 234. It should be understood and appreciated that because the first and second arms 180, 182 resiliently stabilize the box nut retainer 100 in the first aperture 224, sideways movements of the box nut retainer 100 relative to the first panel 218 are reduced when the fastener 126 is introduced to the fastener sleeve 122 and torque is applied to the fastener 126. Thus, cross-threading of the fastener 126 in the fastener sleeve 122, damage to the box nut retainer 100, damage to the fastener 126, damage to the first panel 218, and/or damage to the second panel 220 are reduced.

Figure 8:
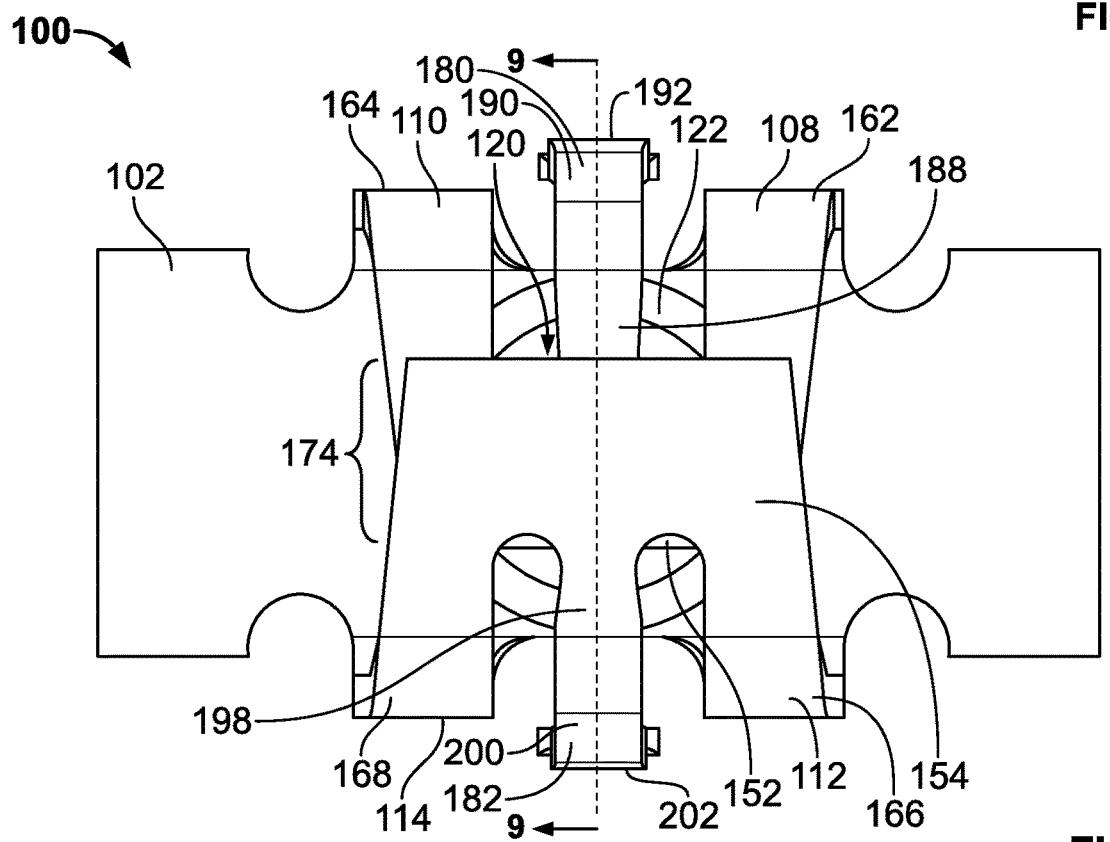
FIG. 8 is a bottom view of the box nut retainer of FIGS. 1-7.
Figure 9:
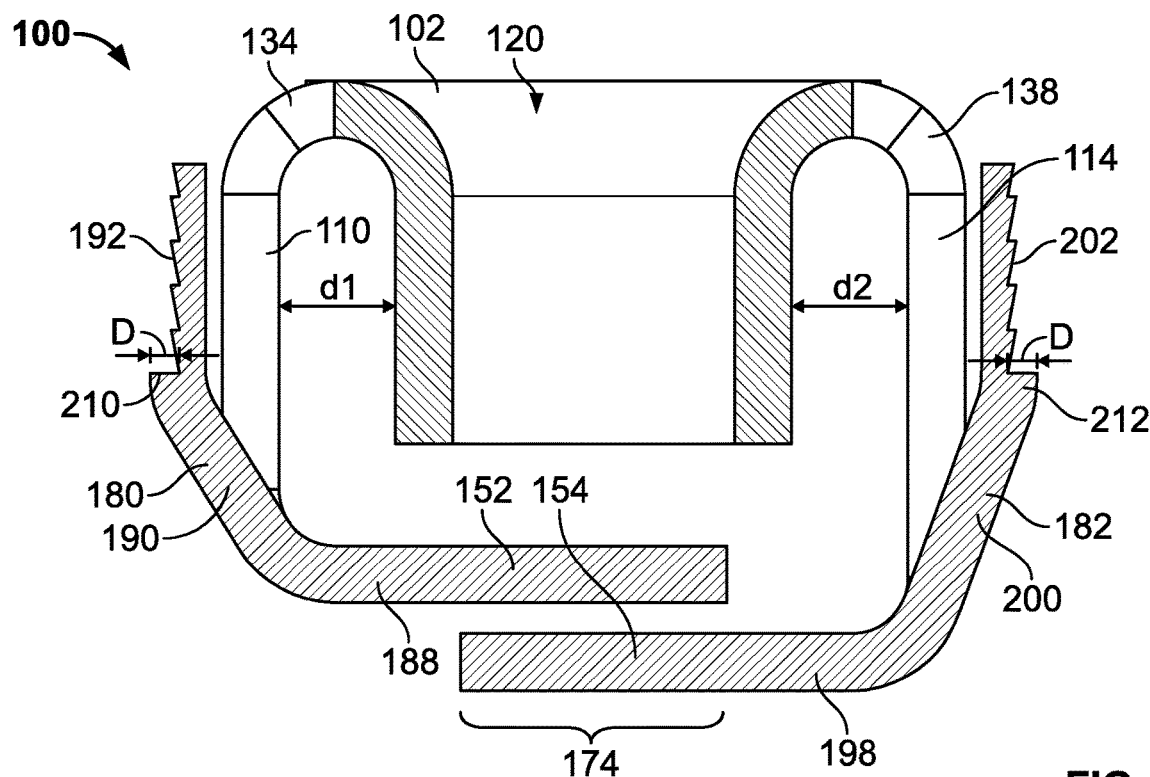
FIG. 9 is a cross-sectional view of the box nut retainer of FIGS. 1-8 taken along line 9-9 of FIG. 8.

With reference to FIGS. 2, 8, and 11, it should be appreciated that the first and second legs 108, 110 and the first tab 152 are tapered toward the opening 120. Likewise, the third and fourth legs 112, 114 and the second tab 154 are tapered toward the opening. Looking specifically at FIG. 11, tapering of the first, second, third, and fourth legs 108, 110, 112, 114 and the first and second tabs 152, 154 may aid insertion of the box nut retainer 100 into the first panel 218 via the first aperture 224.

With reference to FIGS. 13 and 15, once the box nut retainer 100 is inserted within the first panel 218, the fastener 126 is aligned within the second aperture 226 in the second panel 220 and the fastener sleeve 122 of the box nut retainer 100. Further, torque is applied to the fastener 126.

Because the fastener 126 is externally threaded, the fastener 126 threadably engages, threads into, and traverses through the fastener sleeve 122. In other words, as torque is applied to the fastener 126, the fastener 126 is threadably driven downwardly into the fastener sleeve 122. With reference to FIG. 14, it should be understood that because the first aperture 224 is noncircular, the first, second, third, and fourth legs 108, 110, 112, 114 abuttingly engage the walls 230 to prevent the box nut retainer 100 from spinning in the first aperture 224 when torque is applied to the fastener 126.

With reference to FIGS. 13 and 15, responsive to the fastener 126 threading into the fastener sleeve 122, a head 238 of the fastener 126 abuts and/or contacts the second panel 220. The head 238 applies a downward force to the second panel 220 toward the box nut retainer 100.

With reference again to FIGS. 13 and 15, responsive to the fastener 126 threading into the fastener sleeve 122, the distal end 144 of the fastener 126 abuts and/or contacts the first tab 152 and the second tab 154. In other words, the distal end 144 applies a downward force to the first tab 152 and the second tab 154 away from the support 102.

With reference again to FIGS. 13 and 15, responsive to the distal end 144 applying a downward force to the first tab 152 and the second tab 154, the first tab 152 and the second tab 154 spread apart from one another until the fastener 126 is between the first tab 152 and the second tab 154.

With reference to FIGS. 13 and 14, as the first tab 152 and the second tab 154 separate, the first leg 108 and the third leg 112 spread apart from one another and move toward the first panel 218. Thus, the first leg 108 and the third leg 112 work to prevent removal of the box nut retainer 100 from the first panel 218. Likewise, with reference to FIGS. 14 and 15, as the first tab 152 and the second tab 154 separate, the second leg 110 and the fourth leg 114 spread apart from one another and move toward the first panel 218. Thus, the second leg 110 and the fourth leg 114 work to prevent removal of the box nut retainer 100 from the first panel 218.

With reference again to FIGS. 13 and 14, responsive to the first leg 108 and the third leg 112 spreading apart from one another, the first and third curved orthogonal angles 132, 136 are moved (e.g., spread, flattened, opened, etc.) to reduce the curvature of the first and third curved orthogonal angles 132, 136. In other words, as the first leg 108 and the third leg 112 pivot relative to the support 102 toward the first panel 218, the first and third curved orthogonal angles 132, 136 become obtuse.

With reference to FIGS. 14 and 15, responsive to the second leg 110 and the fourth leg 114 spreading apart from one another, the second and fourth curved orthogonal angles 134, 138 are moved (e.g., spread, flattened, opened, etc.) to reduce the curvature of the second and fourth curved orthogonal angles 134, 138. In other words, as the second leg 110 and the fourth leg 114 pivot relative to the support 102 toward the first panel 218, the second and fourth curved orthogonal angles 134, 138 become obtuse.

With reference to FIGS. 13 and 14, responsive to the first leg 108 and the third leg 112 spreading apart from one another, the first and arms 180, 182 are directed toward the first panel 218. Thus, looking specifically at FIG. 15, the first and second serrated fingers 192, 202 move inwardly into the first aperture 224 until the respective first and second ledges 210, 212 contact the first panel 218. With reference to FIGS. 14 and 15, it should be understood that the first and arms 180, 182 are also directed toward the first panel 218 responsive to the second leg 110 and the fourth leg 114 spreading apart from one another.

When the first and third legs 108, 112, as shown in FIG. 13, and the second and fourth legs 110, 114, as shown in FIG. 15 are retainingly folded against the first panel 218 and further torque is applied to the fastener 126, the second panel 220 is drawn toward the box nut retainer 100. Thus, with reference to FIGS. 13 and 15, once the box nut retainer 100 is retainingly deformed against the first panel 218, additional torque applied to the fastener 126 approaches the first and second panels toward one another. When the second panel 220 contacts the support 102, further torque applied to the fastener 126 compresses the support 102 between the first and second panels 218, 220. Further, with reference to FIG. 13, further torque applied to the fastener 126 compresses the first and second panels 218, 220 between the head 238 and the first and third legs 108, 112. Additionally, with reference to FIG. 15, further torque applied to the fastener 126 compresses the first and second panels 218, 220 between the head 238 and the second and fourth legs 110, 114.

As used herein, panel may refer to any component that may be attached or assembled to another component. Any of the panels described herein may be made of any suitable material, for example, a metal or plastic material.

Embodiments of the present disclosure provide a fastening system, and, more particularly, a box nut retainer system that is configured to securely connect multiple components together. The box nut retainer system includes serrated fingers, which prevent incidental movement of the box nut retainer system prior to engagement of a fastener therewith and prevent disengagement of the box nut retainer system.

From the foregoing, it will be appreciated that the above example box nut retainer 100 resiliently adapts to varyingly-sized apertures in substrate panels. Thus, the box nut retainer 100 is laterally stabilized in the aperture. Because the box nut retainer 100 is laterally stabilized in the aperture, cross-threading of threaded fasteners introduced into the box nut retainer 100 may be reduced. Thus, fewer box nut retainers 100 may be damaged, work stoppages along assembly lines utilizing the box nut retainer 100 may be reduced, and time and energy expended associated with the work stoppage may be reduced. Thus, the above-disclosed box nut retainer 100 conserves resources and energy as compared to existing fasteners.

While various spatial and directional terms, such as top, bottom, lower, mid, lateral, horizontal, vertical, front and the like may be used to describe embodiments of the present disclosure, it is understood that such terms are merely used with respect to the orientations shown in the drawings. The orientations may be inverted, rotated, or otherwise changed, such that an upper portion is a lower portion, and vice versa, horizontal becomes vertical, and the like.

Variations and modifications of the foregoing are within the scope of the present disclosure. It is understood that the embodiments disclosed and defined herein extend to all alternative combinations of two or more of the individual features mentioned or evident from the text and/or drawings. All of these different combinations constitute various alternative aspects of the present disclosure. The embodiments described herein explain the best modes known for practicing the disclosure and will enable others skilled in the art to utilize the disclosure. The claims are to be construed to include alternative embodiments to the extent permitted by the prior art.

To the extent used in the appended claims, the terms "including" and "in which" are used as the plain-English equivalents of the respective terms "comprising" and "wherein." Moreover, to the extent used in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

Various features of the disclosure are set forth in the following claims.

We claim:

1. A component retainer system, comprising:
a component retainer comprising:
 a support;
 a fastener sleeve defining an opening and extending from the support;
 a first leg connected to the support, wherein the first leg is spaced laterally outwardly from the support;
 a second leg connected to the support, wherein the second leg is spaced laterally outwardly from the support;
 a tab that connects the first leg to the second leg; and
 a resilient arm connected to the tab between the first leg and the second leg, the resilient arm having a finger and a second portion,
a fastener inserted into the fastener sleeve and contacting the tab, the fastener comprising a head,
a first panel comprising:
 a first aperture extending between a first surface and a second surface; and
 a first wall that defines the first aperture, and
a second panel positioned between the head and the support,
wherein the head compresses the second panel onto the support, and the support toward the first surface,
wherein the second portion faces the second surface, and the finger contacts the first aperture,
wherein the finger contacts the first wall and extends linearly directly from the resilient arm, and
wherein in a rest configuration the finger is disposed substantially parallel with an insertion axis defined by the fastener sleeve and is spaced a distance from the fastener sleeve which is greater than a distance between the fastener sleeve and the resilient arm.

2. The component retainer of claim 1, wherein the resilient arm defines a ledge.

3. The component retainer of claim 1, wherein the fastener sleeve is internally threaded.

4. The component retainer of claim 1, wherein the resilient arm extends outwardly beyond the support.

5. The component retainer of claim 1, wherein the second portion contacts the second surface.

6. The component retainer of claim 1, further comprising:
a second tab connected to a third leg and a fourth leg that contacts the fastener.

7. The component retainer of claim 6, wherein the third leg extends from the support via a curved orthogonal angle.

8. The component retainer of claim 6, wherein a second resilient arm pivots resiliently relative to the second tab.

9. The component retainer of claim 6, wherein the third and fourth leg extend downwardly from the support, and wherein a second resilient arm extends from the second tab between the third leg and the fourth leg.

10. The component retainer of claim 9, wherein the fastener sleeve is between the resilient arm and the second resilient arm.

11. A component retainer system, comprising:
a first panel comprising:
 a first aperture extending between a first surface and a second surface; and
 a first wall that defines the first aperture, and
a component retainer inserted into the first aperture of the first panel, comprising:
 a support;
 a first leg connected to the support;
 a first tab extending from the first leg; and
 a resilient arm extending outwardly from the first tab and having a ledge at an end of the resilient arm and a serrated finger that projects from the ledge,
wherein the resilient arm acts as a spring to laterally stabilize the first leg in the first aperture, the serrated finger contacts the first wall, a portion of the support contacts the first surface, and the ledge faces the second surface.

12. The component retainer system of claim 11, wherein the ledge projects away from a fastener sleeve.

13. The component retainer system of claim 11, wherein the resilient arm pivots resiliently relative to the first tab.

14. The component retainer system of claim 11, wherein the resilient arm comprises an angled portion that extends outwardly relative to the first leg and upwardly toward the support.

15. The component retainer system of claim 14, wherein the serrated finger extends from the angled portion toward the support.

16. A component retainer, comprising:
a support;
a first leg and a second leg extending downwardly from the support, and extending outwardly beyond the support, wherein the first leg and the second leg are connected at a distal end, and the first leg and the second leg connect to the support through a first curved orthogonal angle and a second curved orthogonal angle, respectively, and extend in an orthogonal direction with respect to the support;
a fastener sleeve defining an opening and extending from the support; and
an arm extending outwardly relative to the first leg, and upwardly toward the support, wherein the arm extends between the first leg and the second leg, and wherein the arm includes a serrated finger extending toward the support and having at least one serration, wherein the at least one serration defines a first depth measured orthogonally from the serrated finger to a distal-most point on the at least one serration,
wherein the serrated finger and a portion of the arm define a ledge, wherein the ledge defines a second depth measured orthogonally from the serrated finger, and wherein the second depth is greater than the first depth, and
wherein a plane intersects the serrated finger, the first curved orthogonal angle, and the fastener sleeve.

17. The component retainer of claim 16, wherein the arm is capable of pivoting resiliently.

18. The component retainer of claim 16, further comprising:
a third leg and a fourth leg extending downwardly from the support opposite the first leg and the second leg, wherein the third leg and the fourth leg are connected at a second distal end; and
a second arm extending outwardly relative to the support and upwardly toward the support, wherein the second arm extends between the third leg and the fourth leg.

19. The component retainer of claim 18, wherein the second arm comprises a second serrated finger extending toward the support.

20. The component retainer of claim 19, wherein the serrated finger and the second serrated finger are parallel to each other.

* * * * *